United States Patent Office 3,743,581
Patented July 3, 1973

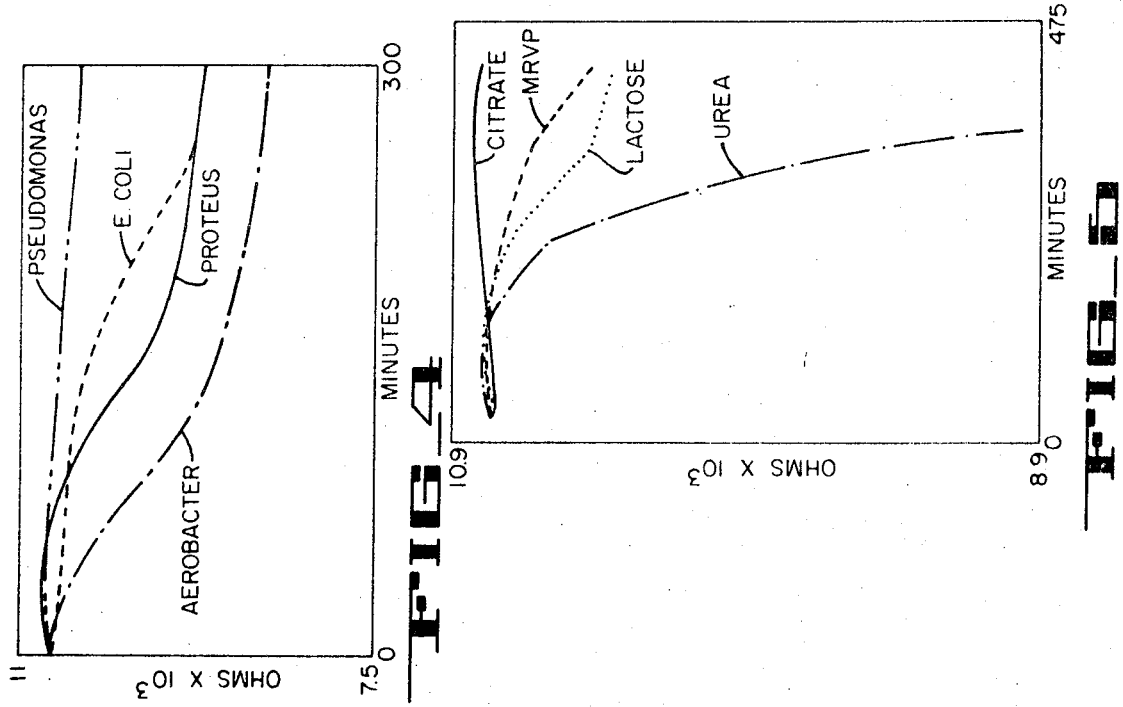
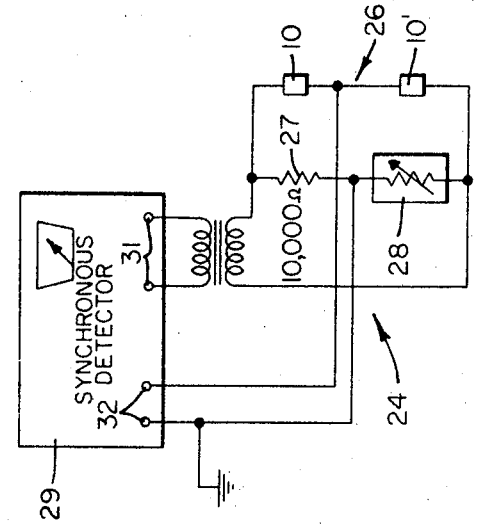
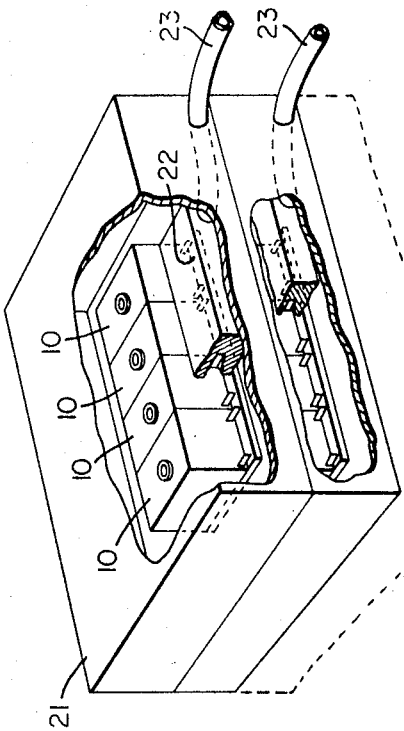
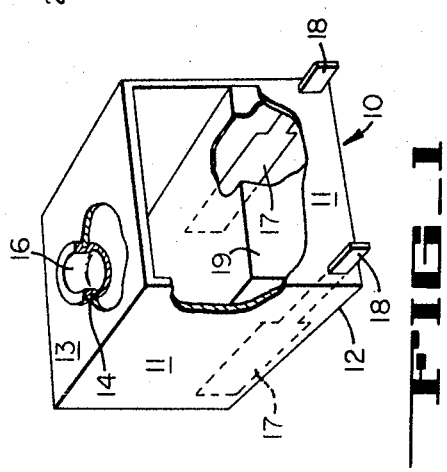
INVENTORS
PAXTON CADY
WILLIAM J. WELCH
ATTORNEYS

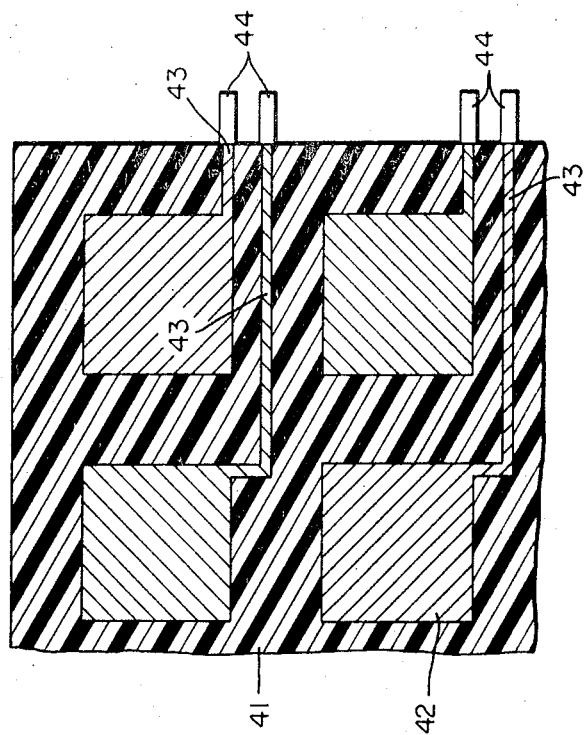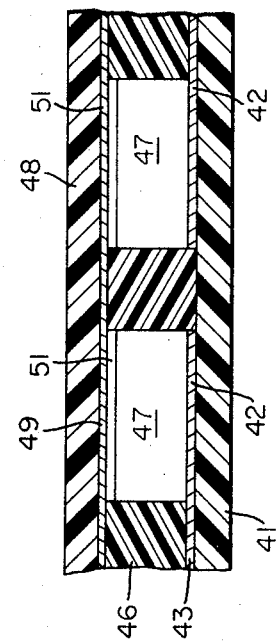

3,743,581
MICROBIOLOGICAL DETECTION APPARATUS
Paxton Cady, Los Altos Hills, and William J. Welch, Kensington, Calif., assignors to Bactomatic, Incorporated
Filed Oct. 21, 1970, Ser. No. 82,732
Int. Cl. C12k 1/04
U.S. Cl. 195—103.5 R         8 Claims

ABSTRACT OF THE DISCLOSURE

Microbiological growth is determined with great rapidity by measuring electrical conductivity changes in sealed cells having selected varieties of nutrient media inoculated with a sample containing suspected microbial contamination. The measurement and selection of nutrient media allows determination of the presence, type, antibotic sensitivity and a quantitative count of bacteria and other micro-organisms present in any selected sample. Several types of growth and conductivity cells are provided for measuring the change in electrical conductivity.

BACKGROUND OF THE INVENTION

The present invention relates to methods for detecting the growth of microbiological organisms and apparatus utilized therefor and more particularly to methods and apparatus for rapidly detecting and identifying such organisms by measurement of changes in the electrical conductance of nutrient media upon which such organisms are grown.

Determination of the presence, identity and extent of contamination by microbiological organisms of biological, medical, food, soil, sewage, etc. samples is of extreme importance to analysis, diagnosis and treatment in many areas. Quality control of food products, control of sewage treatment, medical diagnosis and treatment, production of many types of pharmaceuticals and the like are all dependent upon the identification and quantitative determination of microbial components present in the systems of interest.

Such determinations have heretofore necessitated prolonged growth periods of the specimens in various nutrients in order to achieve sufficient growth thereon to afford visual counting of distinct groups of colonies formed from the original specimen. It is not unusual for days to elapse before the growth is sufficient to permit positive counting and identification of the microbial specimens. In some instances, it takes a week to several weeks to culture the specimens in order to obtain positive identification and a quantitative analysis.

This slowness of previous methods is extremely costly as well as time-consuming, since the employment of visual techniques requires rather large and bulky growth surfaces as well as extensive handling of a series of cultures in the counting apparatus; but perhaps more importantly, in the case of medical diagnosis such long delays can force the physician to blindly initiate therapy without positive confirmation of the identity of the offending organisms. Not infrequently the wrong drug, i.e. antibiotic, is selected only to be discovered ineffective when the patient's condition deteriorates. It is only days later that the correct identification can be made by current laboratory methods.

SUMMARY OF THE INVENTION

In the present invention apparatus is provided wherein the growth of micro-organisms in nutrient media is detectable within several hours of the time the organisms are placed thereon. Additionally, using the techniques disclosed hereafter, the micro-organisms can be identified as to type, antibiotic sensitivity and concentration in the initial specimen within a very few hours of initiating the procedures.

Not only can be micro-organisms be detected, identified and characterized as noted above, but such can be accomplished using very small amounts of nutrient media and simple easy-to-operate apparatus. Further the space requirements to test and identify many different samples or sources of micro-organisms is also greatly minimized over previous methods.

More specifically sealed sterile nutrient containing cells are provided into which the contaminated solutions are introduced, as by for instance inoculation. The inoculated cells are incubated and at the same time the electrical conductivity of the nutrient media therein is monitored. Changes in the conductivity are recorded. From comparison with similar cells previously inoculated with cultures of known micro-organisms, and whose conductivity change is known in relation to the relative concentration of micro-organisms originally introduced therein, the concentration of contaminating organisms can be calculated.

By innoculating an array of cells previously provided with various mixes of growth inhibiting materials, the contaminating micro-organisms can be identified as to type and antibiotic susceptibility by observing the lack of change in electrical conductivity in each cell, or by noting the rate of change in conductivity, if growth occurs. Such methods of identification and quantitative analysis will be more fully described hereinafter.

It is therefore a principal object of the invention to provide a method for identifying micro-organisms within times several orders of magnitude shorter than in previous methods.

It is another object of the invention to provide a method for identifying micro-organisms both as to type and quantity within a few hours as contrasted to days or even weeks required by previous methods.

It is another object of the invention to provide apparatus for receiving micro-organisms in preselected varieties of nutrient media, and thereafter detecting the change in electrical conductivity of such media resulting from the growth of said micro-organisms thereon.

It is still another object of the invention to provide unique cells adapted to provide growth sites for micro-organisms while being provided, at the same time, with means for observing and measuring changes in electrical conductivity in said cells.

Other objects and advantages of the method and apparatus of the invention will become apparent upon review of the following description and the accompanying drawing.

BRIEF DESCRIPTION OF THE DRAWING

The drawing accompanying this description consists of a number of figures in which:

FIG. 1 depicts one form of a single growth and conductivity cell of the invention in a cut-a-way isometric view;

FIG. 2 depicts in schematic fashion a series of cells placed in position within an incubator and connected to electrical contacts for transmitting changes in conductivity;

FIG. 3 is a circuit diagram of electrical apparatus for detecting and recording changes in the electrical conductivity of the cells of the invention;

FIG. 4 is a graph illustrating the change in conductivity with time when the micro-organisms Proteus, Aerobacter, Pseudomonas and *E. coli* are grown on a 1% peptone-dextrose nutrient medium;

FIG. 5 is a graph illustrating conductivity change with time when the micro-organism Proteus is grown in various different nutrient media;

FIGS. 6, 7, 8, 9 and 10 are all schematic illustrations of the manner in which 16 different antisera are distributed into 4 conductance cells in order to identify a particular micro-organism;

FIG. 11 is an elevation in cross-section of an alternate form of conductivity cell; and FIG. 12 is a plan view, with top cover removed, of an alternate form of conductivity cell.

DETAILED DESCRIPTION OF THE INVENTION AND THE PREFERRED EMBODIMENTS

To achieve growth all living organisms take in nutrients and eliminate waste products, such process being generally known as the metabolic process. Micro-organisms are no different in this respect from other forms of life whereby the micro-organism achieves growth by consuming a well-characterized type of nutrient and in turn eliminating or discharging similarly well-characterized waste materials.

The nutrients may most usually be rather complex organic molecules such as proteins, carbohydrates, amino acids, fats and the like. However the waste products tend to be considerably simpler molecules, a great number of which form mobile ionic species. These ionized waste products will change the electrical conductivity of the media into which the are discharged.

Thus the electrical conductivity of the nutrient media changes with micro-organism growth therein and the concurrent discharge into the media of the ionized waste products. The abundance of the ionized waste products is, of course, dependent directly upon the rate of growth and attendant metabolic activity of the organisms, whereby for any given species greater or more rapid growth will result in a greater or more rapid increase in the ionized waste products and concurrent greater or more rapid change in electrical conductivity of the media.

The proportion of ionized waste products and their relative differences in electrical mobility is also characteristic of any particular species of organism. Thus two differing organisms having identical rates of growth, will deliver to the supporting media different net amounts of ionized particles having varying mobility characteristics. Thus any growing micro-organism will alter the electrical conductivity of the medium in which it is growing in accordance with: (1) its rate of growth, and (2) the ionic mixture characteristic of the waste products of that particular species.

For the purposes of the invention, standard nutrient media are modified in order to maximize the conductivity changes. This requires attention to two factors, the salt concentration and the buffering capacity. The salt concentration was made as low as possible but still consistent with good micro-organism growth. A low salt concentration provides low conductivity for the nutrient medium and hence a large fractional change of the solution conductivity accompanying the organism growth. A low buffering capacity permits large pH changes in the medium accompanying growth and maximizes the conductance changes that accompany pH changes.

In the present invention, the above noted phenomena are utilized to identify particular micro-organisms and to determine their quantitative presence in any contaminated source. More specifically, prepared conductivity cells containing nutrient media are inoculated with micro-organisms and the change in conductivity of such cells is recorded. The conductivity change, when compared with uncontaminated reference cells containing identical nutrients, is utilized to determine the nature of the contaminating micro-organisms and their quantitative presence in the initial contaminated samples. The change in cell conductivity is such that the micro-organism can be detected and identified within a period of several hours.

The following is a more detailed description of the invention. FIG. 1 shows a conductivity cell 10, of generally cubical construction. Cell 10 is hollow inside and has side walls 11 integral with a bottom 12. A top 13 is sealed onto the base portion by means of suitable glues, or in the event the cell is constructed of thermoplastic materials, the top 13 may be sealed onto the bottom portion by the application of heat.

Top 13 is provided with a central opening 14 which in turn is sealed with a stopper 16 of a rubber-like or similar resilient material. Into the lower half of cell 10 are sealed two electrodes 17. These electrodes 17 are positioned at opposite sides of cell 10 and are further provided with electrical contacts 18 attached to each electrode respectively. Contacts 18 pass through a tight seal in side wall 11 of cell 10 and extend out to form pronged extensions as shown.

The electrodes 17 are most suitably fabricated from a chemically inert metallic conducting material such as stainless steel. Cell 10, including the base 12, walls 11 and top 13, is most suitably fabricated from an inert, sterilizable plastic such as polyethylene, polypropylene, polystyrene or the like. The base portion may be formed by molding with the electrodes sealed therein while top 13 may be sealed thereto as previously described.

The cell is sterilized prior to use, and the interior is filled to perhaps half of its interior volume with a sterile nutrient medium 19. The cell is then sealed with the stopper 16 after which it is ready for use.

If the cell 10 is produced by mass production methods, it can be fabricated under sterile conditions, filled with preselected nutrients, stoppered and sealed into sterile packages in a continuous integrated series of steps. The user need only select the cells filled with the desired nutrients in order to carry out his studies.

The cell or cells with any preselected nutrients therein are inoculated by inserting the sample into the nutrient 19 by a syringe through stopper 16. The inoculated cell is then placed in an incubator 21 along with any desired number of other cells 10. All of the cells 10 have their contacts 18 inserted into electrical receptacles 22, provided within incubator 21.

Multiconductor cables 23 connect the receptacles 22 and the cells 10 plugged thereinto to the detection circuit 24 (FIG. 3) now to be described.

With reference to FIG. 3, the detection circuit 24 comprises a current nulling bridge network 26 of the Wheatstone type wherein one arm of the bridge includes the inoculated cell 10, a second arm includes a reference cell 10' which is identical with cell 10 as to construction and nutrient medium, but is however uninoculated with the unknown micro-organism. A third arm of the bridge contains a fixed resistance 27 with any suitable value, for instance 10,000 ohms. The fourth arm of the bridge circuit 26 includes a precision decade resistor box 28.

The entire bridge circuit 26 is connected to an A.C. signal source and synchronous detector 29 that contains an A.C. signal generator for feeding into the bridge circuit 26 at the output terminals 31. The null terminals of the bridge circuit 26 are, in turn, connected to signal input terminals 32 on the synchronous detector 29.

Many suitable signal source and synchronous detectors are commercially available. For example, one suitable device is the "Lock-In Amplifier," Model JB–4, manufactured by Princeton Applied Research, Inc. Such a device provides an A.C. signal which is applied to the signal source terminals of the bridge circuit 26 and gives an indication of the amplitude of the A.C. signal generated across the null terminals of the bridge circuit.

In operation, the conductance, or more conveniently its inverse, the resistance, of the inoculated cell 10 is measured as follows:

Both cell 10 and reference cell 10' are placed into incubator 21 with their contacts 18 inserted into receptacles 22. The selected cells are then electrically connected into bridge circuit 26 by selection with rotary switches (not shown). The A.C. signal from generator 29 is then turned on and decade box 28 is adjusted until the reading on synchronous detector 29 is zero, at which point bridge circuit 26 is balanced. The ratio of the resistance of inoculated cell 10 is to that of reference cell 10' as the ratio of the fixed resistance 27 is to the resistance of decade box 28.

By such circuitry the resistance (and conductivity) of cell 10 can be ascertained to within about one part in one hundred thousand or one million. Such sensitivity is quite sufficient to rapidly detect micro-organism growth in the known nutrient media.

Having ascertained the conductance of the inoculated cell 10, other incubating cells 10 are similarly measured and the results recorded. Thus the conductance of the inoculated cells is monitored over any desired period of time. A plot of the change in conductance with time will reveal a curve that is characteristic for a particular species of micro-organism in the medium or media studies. With such time-growth vs. conductance data, the identity and quantity of any microorganism can be readily ascertained within a very few hours.

For instance FIG. 4 illustrates the resistance vs. time curves of a number of different micro-organisms grown in identical nutrient media. More specifically the species Pseudomonas, E. coli, Proteus, and Aerobacter were all grown in a 1% peptone and 1% dextrose (Difco) nutrient medium. Using the detector circuitry 24 within 300 minutes of the cell inoculation the resistance thereof changed as illustrated.

In the case of Pseudomonas the cell resistance remained practically unchanged having an initial resistance of about 10,300 ohms and decreasing very slightly to about 10,050 ohms after a 300 minute incubation period.

The cell containing Proteus on the other hand had an initial resistance of about 10,300 ohms, but the resistance decreased to a final value of about 9,000 ohms after 300 minutes.

The cell with Aerobacter, on the other hand had an initial resistance of about 10,300 ohms, but after 300 minutes incubation showed a resistance of but about 8,550 ohms.

Thus different species exhibit different conductance curves when grown in identical nutrient media in identical conductance cells. In addition, as illustrated in FIG. 5, each particular micro-organism species produces different conductivity changes in varying types of growth media. This phenomenon may also be utilized to characterize a particular unknown species of contaminating micro-organism. For instance, as illustrated in FIG. 5, the species Proteus was grown in various nutrients in a number of different cells 10.

When incubated in a citrate media with buffer and salt diluted to 20% of standard Koser media, the cell after 30 minutes had a resistance of 10,300 ohms. However after 450 minutes of growth the cell's final resistance showed an insignificant change to 10,330 ohms. On the other hand, when incubated in a urea nutrient (urea 20 grams per liter, monopotassium phosphate 1.82 grams per liter, disodium phosphate 1.9 grams per liter, yeast extract, .02 gram per liter phenol red, .002 gram per liter) at 30 minutes an identical cell had a resistance of 10,300 ohms, but at 375 minutes had a resistance drop to 8,610 ohms.

When grown in a standard methyl-red Voges-Proskauer medium. Proteus, after 30 minutes created a resistance of 10,300 ohms, while at 450 minutes the resistance had dropped to 9,990 ohms. Similarly when grown in lactose nutrient (1% lactose 1% Difco peptone) Proteus created a resistance of 10,300 ohms after 30 minutes and a resistance of 9,920 ohms after 450 minutes.

Thus comparison of a group of resistance curves for an unknown species of micro-organism grown in a series of nutrients with curves of a known species in identical nutrients would reveal the identity of such unknown species since the series of resistance curves are characteristic of that species.

As an example of the sensitivity of the cells of the present invention, conductivity cells were inoculated with E. coli with the following results: When 350, 350 and 35,000 E. coli bacteria were placed in conductance cells, significant changes in conductance occurred in 340 minutes for the lowest concentration, 240 minutes for the 3500 concentration, and in 175 minutes for the highest concentration.

These results indicate that about 65–100 minutes are required to produce a ten-fold increase in the number of bacteria. This corresponds to a 20–30 minute generation time which agrees with other measures of generation times for E. coli.

These results also indicate that three bacteria can be detected in under 600 minutes, hence blood cultures and spinal fluid cultures would take less than 10 hours to detect growth conductimetrically in contast to 5–15 days by current established techniques.

It will be apparent that an efficient utilization of the invention in clinical work will require large numbers of cells having a great variety of growth media. Further efficient utilization of the facilities requires a continuous cycle of cell inoculation, incubation, and conductivity measurement. To this end the incubators may contain arrays of cells stacked one upon the other.

Further the cells 10 may be placed in trays of perhaps 50 cells side by side with each cell in said tray being plugged into receptacles arrayed in a central core. The incubator may be of the lazy-susan configuration whereby six or eight trays of some 50 cells each could be plugged into receptacles at each level.

Further the characterization and identification of each micro-organism to be studied may require not only growth studies in different nutrient media as described above, but also studies as to whether or not specific antisera inhibit or support growth of that micro-organism.

More specifically, small quantities of specific antiserum are added to a rich nutrient medium which supports good growth of a large number of different species of micro-organisms. One such medium is tryptic soy broth. Adding a large number of antisera, each of which inhibits growth only of the micro-organism species which it is directed against, will provide a powerful differential tool to identify the unknown micro-organism.

For example, if one takes 16 specific antisera, each of which is directed against a particular micro-organism species, e.g. Aerobacter, Proteus, etc., and at least one of which is specifically directed against the organism under study, that organism can be characterized by adding the antisera to but four conductance cells according to the schema as illustrated in FIGS. 6 through 10.

In FIG. 6 the antisera are numbered 0 through 15. In a first cell containing nutrient medium are added small quantities of antisera 0, 1, 2, 3, 4, 5, 6 and 7 (FIG. 7). In a second cell are added antisera 0, 1, 4, 5, 8, 9, 12 and 13 (FIG. 8). In a third cell are added antisera 0, 1, 2, 3, 8, 9, 10 and 11 (FIG. 9). Finally in a fourth cell are added antisera 0, 2, 4, 6, 8, 10, 12 and 14 (FIG. 10).

All four cells are then inoculated with the unknown micro-organism, and thereafter incubated and measured as previously described. If growth occurs in cell No. 1 as evidenced by a change in conductance with time, then the organism must not be inhibited by antisera 0, 1, 2, 3, 4, 5, 6 and 7. If growth occurs in cell No. 2 then the organism must not be inhibited by antisera 0, 1, 2, 3, 8, 9, 10 or 11 and so forth.

Growth or nongrowth in each cell can be equated to the numeral 1 equalling growth and the numeral 0 equalling nongrowth. The results of all four cells can thus be summarized by a characteristic binary number such as 1111, meaning growth in all four cells; 1010 meaning growth in cells 1 and 3, but nongrowth in cells 2 and 4;

1110 meaning growth in cells 1, 2 and 3, but nongrowth in cell 4 and so forth.

Upon examination it is apparent that the number indicating growth and nongrowth for the series of cells is a binary number the value of which corresponds to the number assigned to one specific antiserum. For example, 1111 in binary notation equals 15 in decimal notation, and 0101 in binary notation equals 5 in decimal notation. These numbers of the antiserum correspond to the type of organism specifically inhibited by that antiserum. Using the same technique, 64 antisera can be tested by using 6 cells and so on.

Another embodiment of a conductivity cell for use in the present invention is illustrated in FIGS. 11 and 12. These cells are printed media cells suitable for producing thousands upon thousands of cells at great speed and at low cost. Although simple in design, such cells are capable of yielding conductivity data in the same manner as are cells 10 previously described.

Referring to FIGS. 11 and 12, the printed conductivity cells comprise a thin sheet of plastic base 41 such as Mylar, onto which are printed electrically conducting patches 42 of a metal such as aluminum. Each conducting patch 42 is provided with a lead 43 of a similar metal also printed onto the plastic base 41. Each lead 43 extends to the edge of base 41 and is thereat in connection with electrical pins 44 which are crimped onto the edge of base 41.

A spacer sheet 46 of plastic such as Mylar is placed over base 41. Spacer 46 is provided with cutouts corresponding to the metallic patches 42 whereby each patch 42 is open upwardly, but isolated from its neighboring patches.

Coated onto patches 42 are nutrient media 47 in a semisolid state. The nutrient coating is sufficient in volume to fill the entire cell defined by the metal base patch 42 and the spacer sheet 46. Each cell may be provided with the same or different nutrients as desired. Thus specific inhibitors, growth factors or antibiotics may be incorporated in any desired array into the cell medium.

The cells are covered with a top sheet 48 of a similar plastic material. Top sheet 48 has its entire under surface printed with an electrically conducting metal 49 such as aluminum that forms a common electrode for all the cells on sheet 41. A suitable electrical pin (not shown) is provided for top electrode 49 at one edge of sheet 48.

The sheet cells are all prepared under aseptic conditions and are maintained sealed until used.

In use, top sheet 48 is stripped away under aseptic conditions. A thin film 51 of a fluid containing the suspected micro-organism is then sprayed or rolled onto the top surface of all the exposed nutrient media 47 in each cell on the entire sheet.

After the contaminated fluid is absorbed into the nutrient media the upper sheet 48 is reassembled onto the bottom sheet 41. Thus a miniature conductance cell is formed comprising bottom sheet 41, electrode 42, nutrient medium 47, contaminated fluid 51, upper electrode 49 and upper sheet 48.

The pins 44 and the upper common electrode pin are then connected to the conductance measuring circuit previously described while the entire sheet is maintained in a constant temperature incubator. Conductance measurements are then taken as previously described.

By way of example the printed cells comprise a 125 micron thick bottom sheet 41, the spacer sheet and media in the cell is about 200 microns thick. The volume of media in each patch is about 0.2 ml. and a sheet of about 8½ inches by 11 inches would contain about 50 cells. Each cell receives approximately 0.05 ml. of micro-organism containing fluid.

What is claimed is:

1. A method for assessing growth of micro-organisms comprising inoculating a specimen microbiological nutrient medium with a source of suspected micro-organism contamination, incubating the nutrient medium, measuring the initial electrical conductivity of said nutrient medium, taking a plurality of conductivity measurements of said nutrient medium at timed intervals, and observing the change in conductivity of said nutrient medium induced by electrically charged metabolic products being discharged into said media by the micro-organism.

2. The method of claim 1 wherein the conductivity of said nutrient is measured by means of an alternating current nulling bridge circuit and wherein a reference arm of said bridge circuit is uninoculated nutrient medium identical to the specimen nutrient medium.

3. The method of claim 2 wherein a plurality of cells adapted for the electrical measurement of conductivity are provided with a preselected variety of both growth nutrient media and corresponding reference nutrient media, and wherein the plurality of growth nutrient media are all inoculated with the source of suspected micro-organism contaminant, conductivity versus time changes in all such cells are recorded as graphical data and the resulting graphical data is compared to graphical data previously recorded prepared from the growth of known quantities of micro-organisms on identical preselected nutrient media, whereby the micro-organism contaminant is identified, and quantitatively measured.

4. A sealed conductivity cell for growing micro-organisms therein and measuring the change of electrical conductivity resulting from said micro-organism growth comprising a sterilizable electrically non-conducting container, a cover affixed to said container with an opening defined therein, a puncturable resilient stopper sealing said opening, at least two electrically conducting electrodes spaced apart and supported within said container and wherein said electrodes are maintained at a total of only two different electrical potentials within said cell, electrical leads connected to said electrodes and extending in sealing relationship through said container to the exterior thereof, a micro-organism nutrient medium contacting said electrodes and at least partially filling said container.

5. A cell for detecting the change in electrical conductivity of a nutrient medium resulting from the growth of micro-organisms therein comprising a base sheet of nonpermeable electrically nonconducting membrane, a first electrically conducting electrode printed onto said base sheet, an electrical lead connected to said electrode, a sheet of electrically nonconducting nonpermeable membrane covering said base sheet, a second electrode printed on said covering sheet in register with said first electrode, an electrical lead connected to said second electrode, an electrically non-conducting nonpermeable spacer sheet inserted between the base membrane and cover membrane and having an opening therein coextensive with said electrodes to define a cell therebetween, and a semi-liquid nutrient medium contained in said cell and in contact with said first and second electrodes.

6. The cell of claim 5 wherein a multiplicity of said cells are provided between a single base sheet and a single cover sheet.

7. The cell of claim 5 wherein said sheets are plastic sheet material.

8. A method for identifying which antisera from a number of antisera inhibits the growth of specific micro-organisms comprising preparing a plurality of electrical conductivity cells each provided with a nutrient medium which supports the growth of a broad range of micro-organisms, and wherein the plurality of conductivity cells is equal to the exponential number to which the integer 2 is raised to include the number of antisera to be examined, assigning integers beginning with 0 and continuing integers to identify each antisera, inoculating each conductivity cell with one-half of the number of antisera and wherein each cell is inoculated with a different series of one-half of the antisera from every other cell, inoculating each cell with the micro-organisms, incubating said cells, measuring the change in electrical conductivity of said cells wherein a change in conductivity with time indicates micro-organism growth and no change in conductivity indicates no-growth of micro-organism, assigning the numeral 0 to those cells in which there is no growth and the numeral 1 to those cells in which growth occurs, combining the growth and no-growth numerals in cell sequence to form a binary number characteristic of the growth no-growth results observed in said cells and wherein the decimal equivalent of said binary number corresponds to the number assigned to one of said antisera whereby the antisera specifically inhibiting the growth of said micro-organism is identified.

References Cited

UNITED STATES PATENTS

| | | | |
|---|---|---|---|
| 2,789,887 | 4/1957 | Cruikshank | 324—30 B |
| 3,506,544 | 4/1970 | Silverman et al. | 195—103.5 RX |

FOREIGN PATENTS

| | | | |
|---|---|---|---|
| 231,262 | 9/1959 | Australia | 195—103.5 R |

A. LOUIS MONACELL, Primary Examiner

R. J. WARDEN, Assistant Examiner

U.S. Cl. X.R.

195—127, 139; 324—30 R, 30 B

REEXAMINATION CERTIFICATE (475th)

United States Patent [19]

Cady et al.

[11] B1 3,743,581

[45] Certificate Issued Apr. 1, 1986

[54] MICROBIOLOGICAL DETECTION APPARATUS

[75] Inventors: Paxton Cady, Los Altos Hills; William J. Welch, Kensington, both of Calif.

[73] Assignee: Bactomatic, Incorporated

Reexamination Request:
No. 90/000,724, Feb. 15, 1985

Reexamination Certificate for:
Patent No.: 3,743,581
Issued: Jul. 3, 1973
Appl. No.: 82,732
Filed: Oct. 21, 1970

[51] Int. Cl.$^4$ .............. C12Q 1/04; C12Q 1/20; C12M 1/34; C12M 1/16; C12M 1/20; C12R 1/19; G01R 27/02; G01N 27/02
[52] U.S. Cl. .............................. 435/34; 435/33; 435/291; 435/299; 435/301; 435/849; 324/65 R; 324/439
[58] Field of Search .................... 204/403, 1 T

[56] References Cited
FOREIGN PATENT DOCUMENTS
6914627 4/1970 Netherlands .

OTHER PUBLICATIONS

James B. Allison et al., Journal of Bacteriology, vol. 36, pp. 571-586 (1938).
J. McPhillips et al., Australian Journal of Dairy Technology, pp. 192-196 (1958).
T. J. Mackie et al., Handbook of Practical Bacteriology, pp. 213-216 (1948).
M. Oker-Blom, Centrablat fur Bakt. etc. Abt I Originale, vol. 65 Heft 4/5, pp. 382-389 (1912).
Parsons, Journal of Bacteriology, vol. 11, pp. 177-188 (1926).
Reports on Public Health and Medical Subjects, No. 71-The Bacteriological Examination of Water Supplies (1956).
Stewart, Journal of Experimental Medicine, vol. 4, 1899, pp. 235-243 and Plates V to VIII.
Taylor, The Examination of Waters and Water Supplies, Seventh Edition, 1958, p. 394.

*Primary Examiner*—Robert J. Warden
*Assistant Examiner*—Randall E. Deck

[57] ABSTRACT

Microbiological growth is determined with great rapidity by measuring electrical conductivity changes in sealed cells having selected varieties of nutrient media inoculated with a sample containing suspected microbial contamination. The measurement and selection of nutrient media allows determination of the presence, type, antibotic sensitivity and a quantitative count of bacteria and other micro-organisms present in any selected sample. Several types of growth and conductivity cells are provided for measuring the change in electrical conductivity.

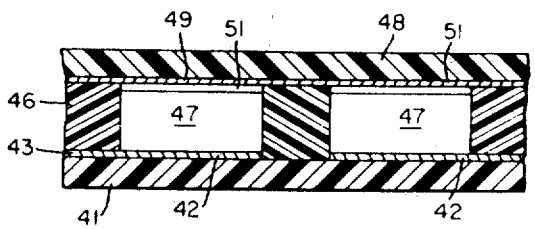

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 5-8 is confirmed.

Claims 1-4 are cancelled.

* * * * *